US007904716B2

(12) United States Patent
Dokuni

(10) Patent No.: US 7,904,716 B2
(45) Date of Patent: Mar. 8, 2011

(54) PROCESSING DEVICE AND PROCESSING METHOD

(75) Inventor: Kenji Dokuni, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1239 days.

(21) Appl. No.: 11/464,927

(22) Filed: Aug. 16, 2006

(65) Prior Publication Data
US 2007/0067627 A1 Mar. 22, 2007

(30) Foreign Application Priority Data

Sep. 22, 2005 (JP) ................ 2005-275163

(51) Int. Cl.
H04L 9/32 (2006.01)
G06F 21/00 (2006.01)
G06F 7/04 (2006.01)
(52) U.S. Cl. ......... 713/168; 713/161; 713/170; 713/182; 713/183; 713/184; 713/600; 713/601; 726/2; 726/3; 726/4; 726/5; 726/9; 726/10; 726/28
(58) Field of Classification Search .................. 713/168, 713/183–184; 726/2, 4, 28
See application file for complete search history.

(56) References Cited

U.S. PATENT DOCUMENTS

| 2002/0152070 | A1* | 10/2002 | Oda .............................. 704/246 |
| 2003/0046540 | A1* | 3/2003 | Nakamura et al. ............. 713/168 |
| 2003/0101349 | A1* | 5/2003 | Wang ............................ 713/186 |
| 2004/0073440 | A1* | 4/2004 | Garbers et al. ................... 705/1 |
| 2004/0196492 | A1* | 10/2004 | Johnson et al. ............... 358/1.15 |
| 2005/0253889 | A1* | 11/2005 | Shozaki et al. ................. 347/19 |
| 2006/0200427 | A1* | 9/2006 | Morrison et al. ............... 705/67 |
| 2007/0038872 | A1* | 2/2007 | Bridges et al. ................ 713/193 |

FOREIGN PATENT DOCUMENTS

| JP | 2001156960 A | 6/2001 |
| JP | 2003067346 A | 3/2003 |
| JP | 2004-062283 | 2/2004 |
| JP | 2004102417 A | 4/2004 |
| JP | 2004259208 A | 9/2004 |
| JP | 2005-346310 | 12/2005 |

OTHER PUBLICATIONS

Japanese language office action and its English language translation for corresponding Japanese application 2005275163 lists the reference above.

* cited by examiner

Primary Examiner — Christian LaForgia
Assistant Examiner — Jenise E Jackson
(74) Attorney, Agent, or Firm — DLA Piper LLP (US)

(57) ABSTRACT

A digital MFP carries out an authentication of an operator by a user ID and a password prior to usage of the digital MFP. The digital MFP requests from the operator an instruction as to whether or not to store the successfully authenticated user ID and password in a flash memory along with a generated abbreviated code. When the operator instructs to store, the successfully authenticated user ID and the password are stored in the flash memory along with the generated abbreviated code. The digital MFP retrieves from the flash memory the user ID and the password that form a pair with the abbreviated code entered by the operator using the operation unit, and acquires authentication success or failure information with respect to the retrieved user ID and the password from an authentication server.

21 Claims, 7 Drawing Sheets

PROCESSING DEVICE AND PROCESSING METHOD

RELATED APPLICATIONS

This application claims the benefit of priority under 35 USC 119 of Japanese patent application no. 2005-275163, filed on Sep. 22, 2005, which application is hereby incorporated by reference in its entirety.

BACKGROUND OF THE INVENTION

1. Field of the Invention

The present invention relates to a processing device which carries out an authentication of an operator by authentication information prior to usage of the processing device.

2. Description of the Related Art

A conventional digital Multi Function Peripheral (MFP) including a network authentication function transmits an authentication request including an ID and a password entered by an operator to an authentication server via a network. Then, the digital MFP acquires authentication success or failure information returned from the authentication server via the network, and only when the authentication succeeded, the operator is permitted to use the digital MFP. Among such digital MFPs, to reduce time and effort for entering an ID and a password each time when using the digital MFP, as an alternative of the ID and the password that have been successfully authenticated, a previously entered abbreviated code may be entered.

According to a conventional art, when a prescribed period of time elapses, a user is urged to change the password, and the password is changed.

However, in the conventional digital MFP, the user is required to select and enter a new abbreviated code that is different from an already entered abbreviated code. This is troublesome for the user.

SUMMARY OF THE INVENTION

In order to overcome the problems described above, the present invention provides a processing device, such as a digital MFP, which reduces time and effort required when entering an abbreviated code.

According to a one aspect of the present invention, a processing device carries out an authentication of an operator by authentication information prior to usage of the processing device. The processing device includes an operation unit, an authentication unit, a generation unit, a storage unit, and an instruction requesting unit. The operation unit is operated by the operator. The authentication unit acquires authentication success or failure information from a remote authentication server with respect to the authentication information entered by the operator from the operation unit. The generation unit generates a unique abbreviated code that forms a pair with the successfully authenticated authentication information. The storage unit stores the pair of the abbreviated code and the authentication information. After the authentication succeeds, the instruction requesting unit requests an instruction from the operator as to whether or not to store the successfully authenticated authentication information in the storage unit along with the abbreviated code generated by the generation unit. When a first operation is performed on the operation unit in response to the request from the instruction requesting unit, the pair of the abbreviated code and the successfully authenticated authentication information is stored in the storage unit. In addition, in place of the authentication information entered by the operator from the operation unit, the authentication unit retrieves from the storage unit the authentication information that forms a pair with the abbreviated code entered by the operator from the operation unit. Accordingly, the authentication unit can acquire the authentication success or failure information with respect to the retrieved authentication information.

When a second operation is performed on the operation unit in response to the request from the instruction requesting unit, the successfully authenticated authentication information is not stored in the storage unit.

According to another aspect of the present invention, both the authentication information and the abbreviated code may be entered using the operation unit. When the storage unit stores a pair of the abbreviated code and the authentication information, the authentication unit can acquire the authentication success or failure information for both the authentication information entered by the operator from the operation unit, and the authentication information that forms a pair with the abbreviated code entered by the operator from the operation unit.

According to another aspect of the present invention, when the storage unit stores the pair of the abbreviated code and the authentication information, in case the authentication is carried out successfully with respect to authentication information that is the same as the stored authentication information and a third operation is performed on the operation unit in response to the request from the instruction requesting unit, the authentication information that is the same as the successfully authenticated authentication information is deleted from the storage unit.

According to another aspect of the present invention, after the authentication information is retrieved a prescribed number of times or more and used for acquiring the authentication success or failure information, the authentication information is deleted from the storage unit.

According to another aspect of the present invention, after a prescribed period of time or more elapses from when the authentication information is stored in the storage unit, the authentication information is deleted from the storage unit.

According to these aspects of the invention, since the generation unit generates the abbreviated code, when storing the authentication information in the storage unit along with the abbreviated code, time and effort is omitted for entering the abbreviated code.

In addition, when the second operation is performed, the successfully authenticated authentication information is prevented from being stored in the storage unit. Accordingly, when the operator wishes, the authentication information is not stored in the storage unit. As a result, secrecy of the authentication information id ensured more easily.

In addition, the authentication unit can acquire the authentication success or failure information with respect to the authentication information and also the authentication information that forms a pair with the abbreviated code. Accordingly, the authentication can be completed just by entering the authentication information or the abbreviated code. As a result, it is possible to improve convenience for the user when using the processing device.

In addition, when the third operation is performed, the authentication information that is the same as the successfully authenticated authentication information is deleted from the storage unit. Accordingly, when the operator wishes, the authentication information is deleted from the storage unit. As a result, the secrecy of the authentication information is ensured more easily.

In addition, after the authentication information is retrieved a prescribed number of times or more and used for acquiring the authentication success or failure information, the authentication information is deleted from the storage unit. Accordingly, the authentication information is not left stored in the storage unit. As a result, the secrecy of the authentication information is ensured more easily. Moreover, after a prescribed period of time or more elapses from when the authentication information is stored in the storage unit, the authentication information is deleted from the storage unit. Accordingly, the authentication information is not left stored in the storage unit. As a result, the secrecy of the authentication information is ensured even more easily.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

DETAILED DESCRIPTION OF PREFERRED EMBODIMENTS (1. Overall Configuration of Image Processing System) FIG. 1 is a block diagram illustrating an overall configuration of an image processing system 1 including digital MFPs 10 (11 and 12) according to one embodiment of the present invention.

With reference to FIG. 1, the image processing system 1 includes the digital MFPs 10 (11 and 12), client computers 20 (21 and 22), and an authentication server 30. In the following description, when it is necessary to distinguish the two digital MFPs, the reference numerals 11 and 12 are used. When it is not necessary to distinguish the digital MFPs, a common reference numeral 10 is used. In the same manner, when it is necessary to distinguish the two client computers, the reference numerals 21 and 22 are used. When it is not necessary to distinguish the client computers, a common reference numeral 20 is used.

The digital MFPs 10, the client computers 20 and the authentication server 30 are connected to a Local Area Network (LAN) 50 to enable communication to be carried out between one another. The digital MFPs 10 are also connected to a Public Switched Telephone Network (PSTN) 91. The LAN 50 is connected to a remote network such as the Internet 92 via a network apparatus such as a router 40.

The digital MFPs 10 include a copy mode, a fax mode, a scanner mode and a printer mode. The digital MFPs 10 serve as a processing device which can execute a prescribed process.

The client computers 20 are generally a personal computer.

The authentication server 30 is a server computer that provides a directory service such as a Lightweight Directory Access Protocol (LDAP) service.

Figure 1:
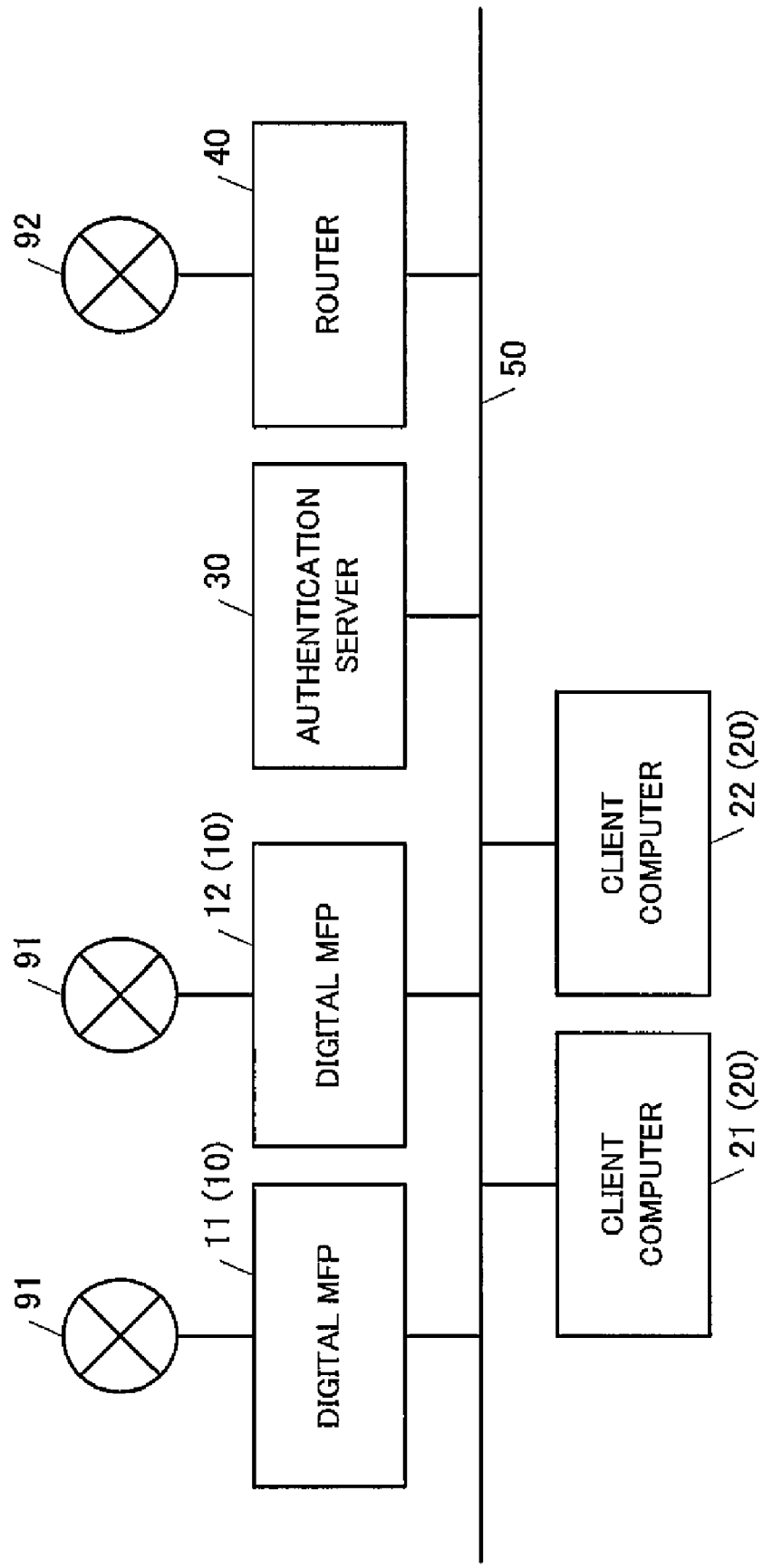
FIG. 1 is a block diagram illustrating an overall configuration of an image processing system including a digital MFP according to one embodiment of the present invention.
Figure 2:
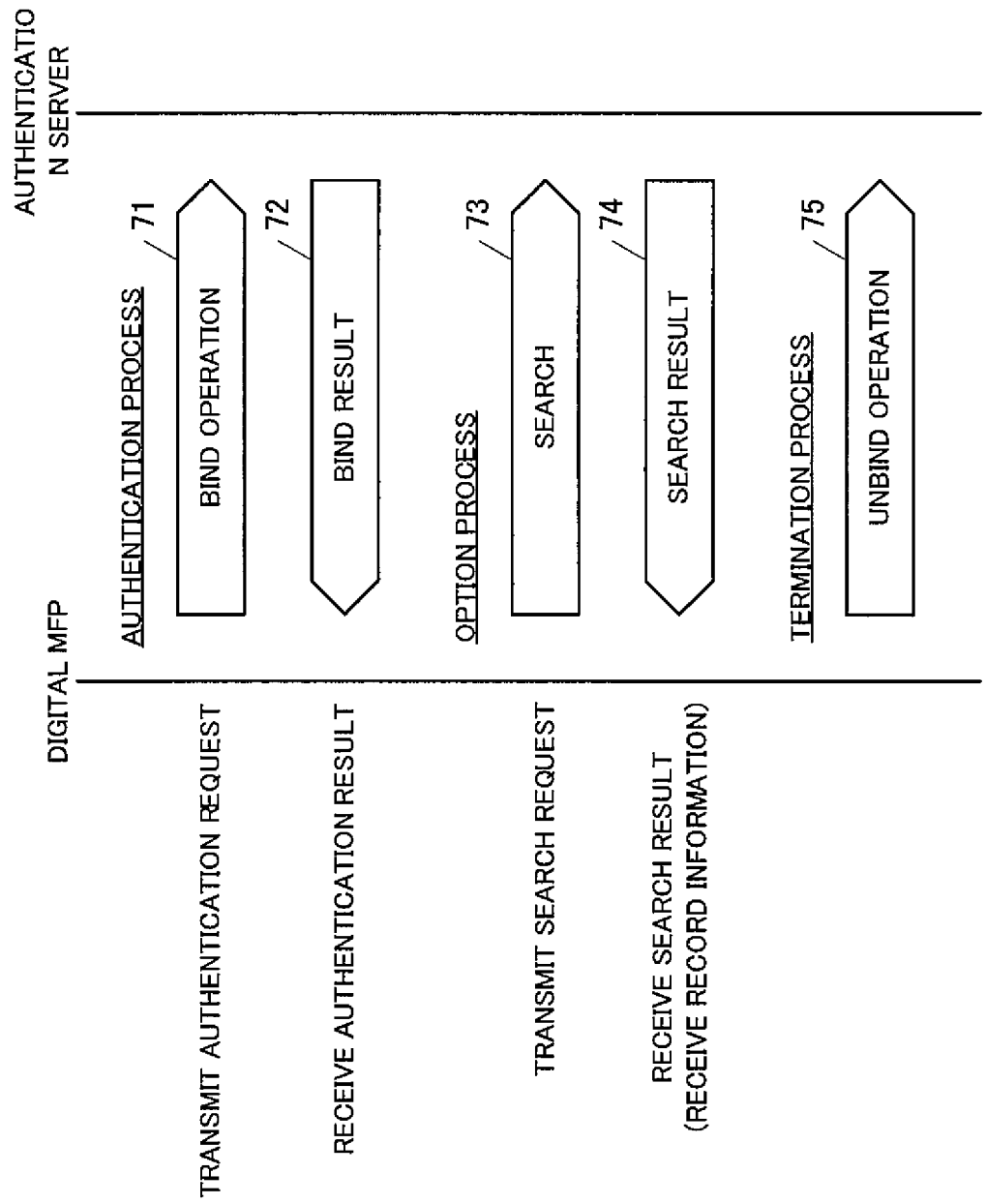
FIG. 2 illustrates a communication protocol between a digital MFP and an authentication server when carrying out an authentication process and an option process.

Provided that the authentication server 30 is an LDAP server, with reference to FIG. 2, a description is made of a communication protocol between the digital MFP 10 and the authentication server 30 when carrying out an authentication process and an option process.

In case of the authentication process, first, a BIND operation 71 is carried out from the digital MFP 10 to the authentication server 30. In response to the BIND operation 71, the authentication server 30 returns a BIND result 72 to the digital MFP 10. In the BIND operation 71, the digital MFP 10 transmits a user ID and a password, i.e. authentication information, to the authentication server 30. When the user ID and the password are appropriate, the authentication server 30 returns "true" to the digital MFP 10 to permit binding of the digital MFP 10. When the user ID and the password are inappropriate, the authentication server 30 returns "false" to the digital MFP 10 to not permit the binding of the digital MFP 10. That is, the BIND operation 71 is an authentication request from the digital MFP 10 to the authentication server 30. The BIND result 72 (BIND permission/rejection) is an authentication result (authentication success or failure information) with respect to the authentication request.

Following the authentication process, an additionally executable option process is executed between the digital MFP 10 and the authentication server 30. In the option process, the digital MFP 10 transmits a search request (SEARCH) 73 to the authentication server 30, and in response to the search request 73, the authentication server 30 returns a search result 74 including record information to the digital MFP 10. The option process may be executed only once or may be executed twice or more.

After the authentication process and the option process, an UNBIND operation 75 is carried out from the digital MFP 10 to the authentication server 30, and a series of the communication protocol between the digital MFP 10 and the authentication server 30 ends.

The authentication server 30 can also carry out the authentication process and the option process with the client computer 20, not only with the digital MFP 10, by the same communication protocol.

(2. Configuration of Digital MFP) FIG. 3 is a block diagram illustrating a configuration of the digital MFP 10 according to one embodiment of the present invention.

Figure 3:
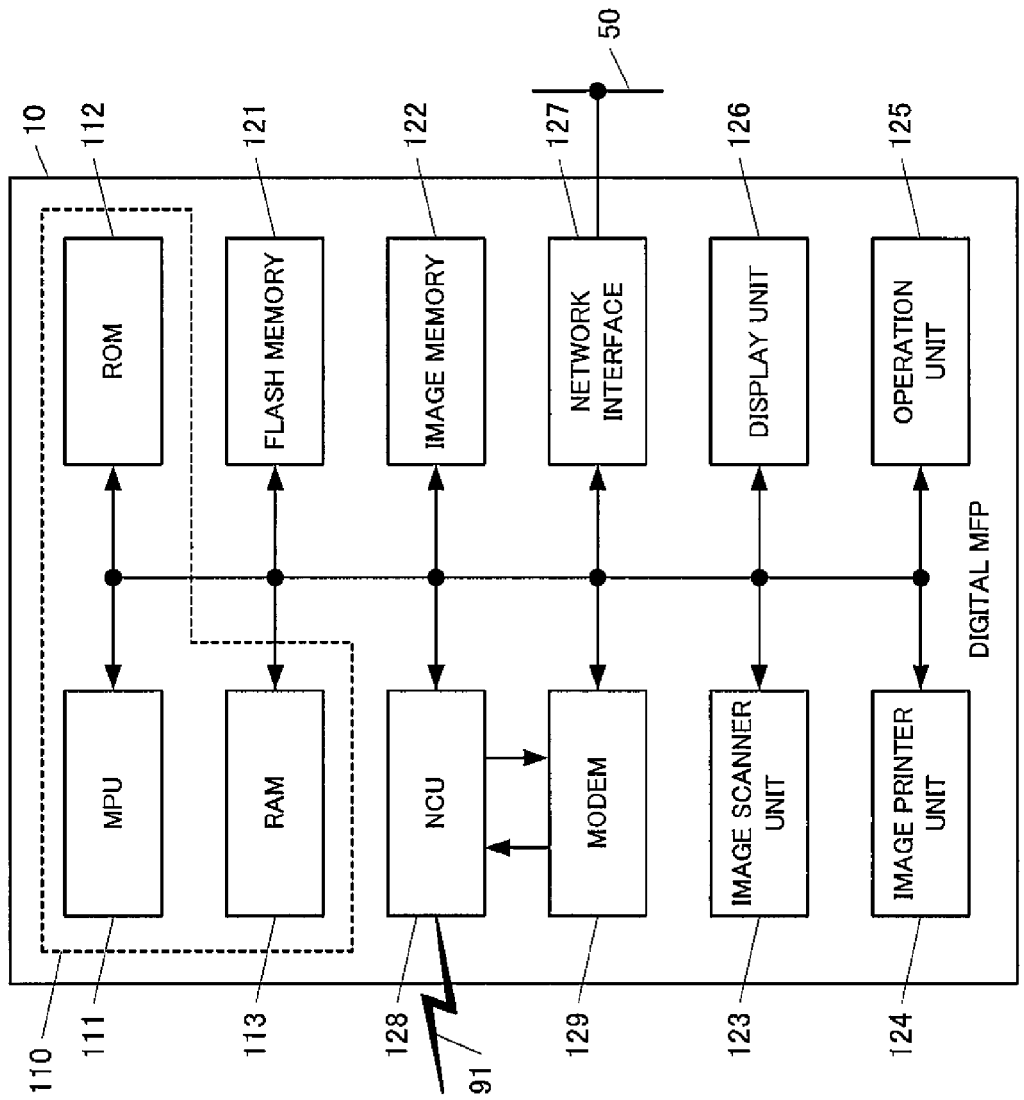
FIG. 3 is a block diagram illustrating a configuration of the digital MFP according to one embodiment of the present invention.

As illustrated in FIG. 3, the digital MFP 10 includes a Micro Processor Unit (MPU) 111, a Read Only Memory (ROM) 112, and a Random Access Memory (RAM) 113. A microcomputer 110 is realized by the MPU 111, the ROM 112 and the RAM 113. The microcomputer 110 executes a program stored in the ROM 112 to control each component of the digital MFP 10, and realizes various functions of the digital MFP 10.

A flash memory 121 of the digital MFP 10 is a nonvolatile memory in which stored contents may be rewritten. The flash memory 121 stores various pieces of information that should be continuously stored. An image memory 122 of the digital MFP 10 stores an image to be processed by the digital MFP 10 in the form of image data.

The digital MFP 10 includes an image scanner unit 123 and an image printer unit 124. The image scanner unit 123 scans an image on an original document by a Charge Coupled Device (CCD) image sensor or the like. The image scanner unit 123 can scan an image on an original document by an Automatic Document Feeder (ADF) method or a Flat Bed Scanner (FBS) method. The image printer unit 124 forms an image on a printing medium by an electrophotographic method.

The digital MFP 10 includes an operation unit 125 and a display unit 126 as a user interface. The display unit 126 displays information in a visible form. The digital MFP 10 adopts a liquid crystal touch-screen display for the display unit 126. The display unit 126 partially functions as the operation unit 125.

A network interface 127 connects the digital MFP 10 and the LAN 50 by the Ethernet (registered trademark), for example.

A Network Control Unit (NCU) 128 and a Modulator Demodulator (MODEM) 129 are used for transmitting and receiving image data via the PSTN 91. The NCU 128 controls a connection established with the PSTN 91. The NCU 128 includes a function for transmitting a dial signal corresponding to a telephone number of a communication destination, and a function for detecting an incoming call. The MODEM 129 modulates transmission data and demodulates received data in accordance with V.17, V.27ter, V.29 or the like based on a facsimile transmission control protocol following the International Telecommunication Union-Telecommunications (ITU-T) recommendation T.30. Alternatively, the MODEM 129 modulates transmission data and demodulates received data in accordance with V.34.

Under the copy mode, the image scanner unit 123 scans an image on an original document, and generates image data relating to the scanned image. Then, the image printer unit 124 forms an image relating to the image data on a printing medium. Accordingly, an image is copied from the original document to the printing medium.

Under the fax mode, the image scanner unit 123 scans an image on the original document, and generates image data relating to the scanned image. Then, the image data is transmitted via the PSTN 91 to another fax machine by a G3 method or a super-G3 method. The digital MFP 10 receives image data transmitted from another fax machine via the PSTN 91 by the G3 method or the super-G3 method. Then, the image printer unit 124 forms an image relating to the image data on a printing medium.

Under the scanner mode, the image scanner unit 123 scans an image on the original document, and generates image data relating to the scanned image. Then, the digital MFP 10 stores the image data in a designated storage location.

Under the printer mode, the digital MFP 10 receives image data transmitted from the client computer 20 via the LAN 50, and the image printer unit 124 forms an image relating to the image data on a printing medium.

(3. Authentication) The digital MFP 10 carries out an authentication of the operator by a user ID and a password prior to usage of the digital MFP 10. For the authentication in the digital MFP 10, the user ID and the password may be entered, or an abbreviated code may be entered as a substitute for the user ID and the password. In the following, a description is made of the authentication carried out in the digital MFP 10 with reference to FIG. 4 through FIG. 7.

Figure 4:
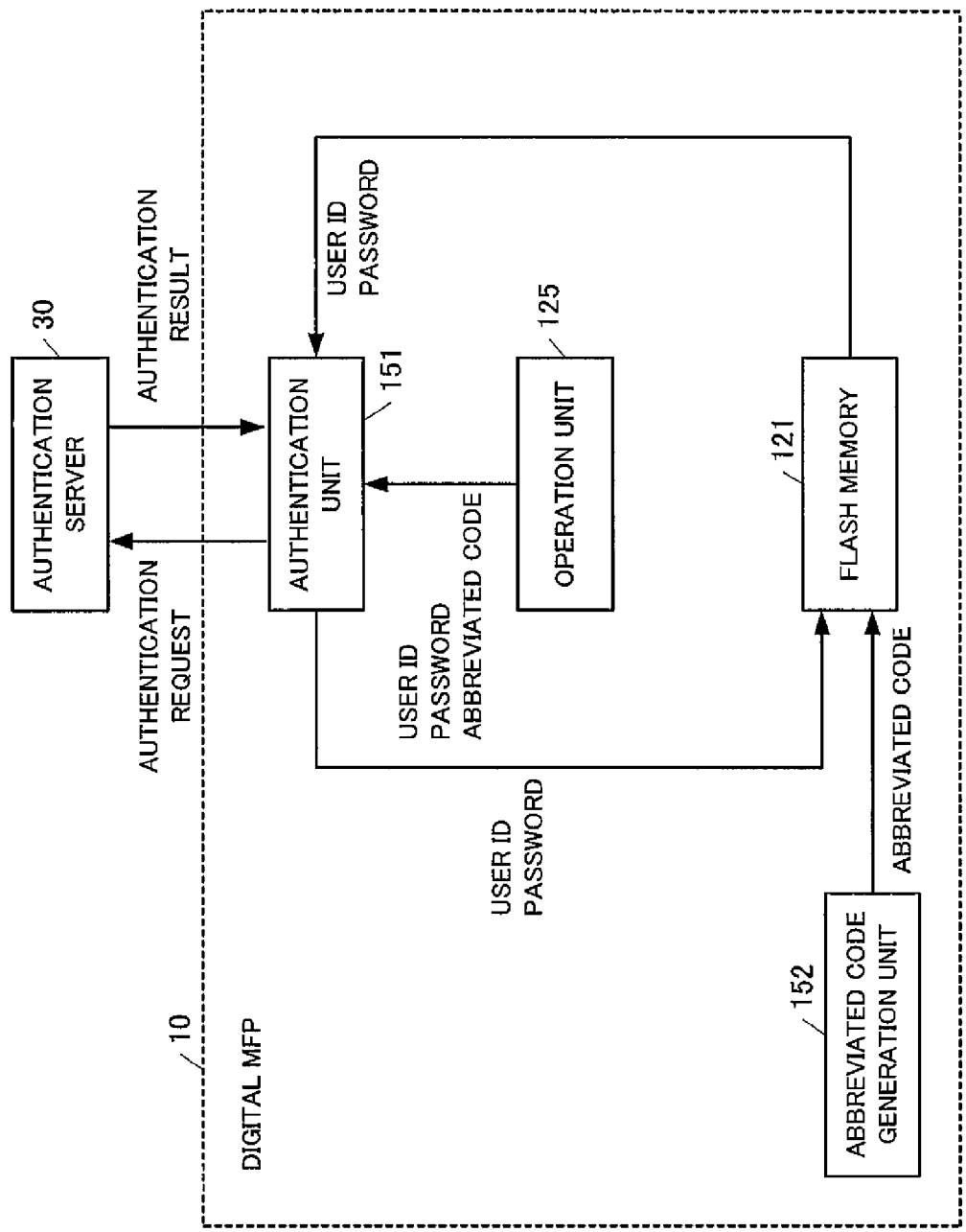
FIG. 4 is a block diagram illustrating a configuration relating to authentication.

(3.1 Configuration Relating to Authentication) FIG. 4 is a block diagram illustrating a configuration relating to the authentication. An authentication unit 151 and an abbreviated code generation unit 152 are constituent elements that are realized by a program executed by the microcomputer 110.

The authentication unit 151 of the digital MFP 10 carries out communication with the authentication server 30, and executes an authentication procedure. The authentication unit 151 transmits an authentication request including a user ID and a password to the authentication server 30, and acquires an authentication result with respect to the user ID and the password from the authentication server 30.

The abbreviated code generation unit 152 generates an abbreviated code that forms a pair with the successfully authenticated user ID and password. The abbreviated code generated by the abbreviated code generation unit 152 is a unique character string that does not overlap with an abbreviated code already stored (registered) in the flash memory 121. Since the abbreviated code is also an irregular character string, the user ID and the password that form a pair with the abbreviated code are difficult to be predicted. The abbreviated code generated by the abbreviated code generation unit 152 is associated with the user ID and the password that form a pair with the abbreviated code, and then stored in the flash memory 121.

When the operator enters a user ID and a password using the operation unit 125 for authentication, the authentication unit 151 acquires an authentication result with respect to the entered user ID and the password from the authentication server 30.

When the operator enters an abbreviated code using the operation unit 125, the authentication unit 151 retrieves the user ID and the password that form a pair with the abbreviated code from the flash memory 121. Then, the authentication unit 151 acquires an authentication result with respect to the retrieved user ID and the password from the authentication server 30.

Figure 5:
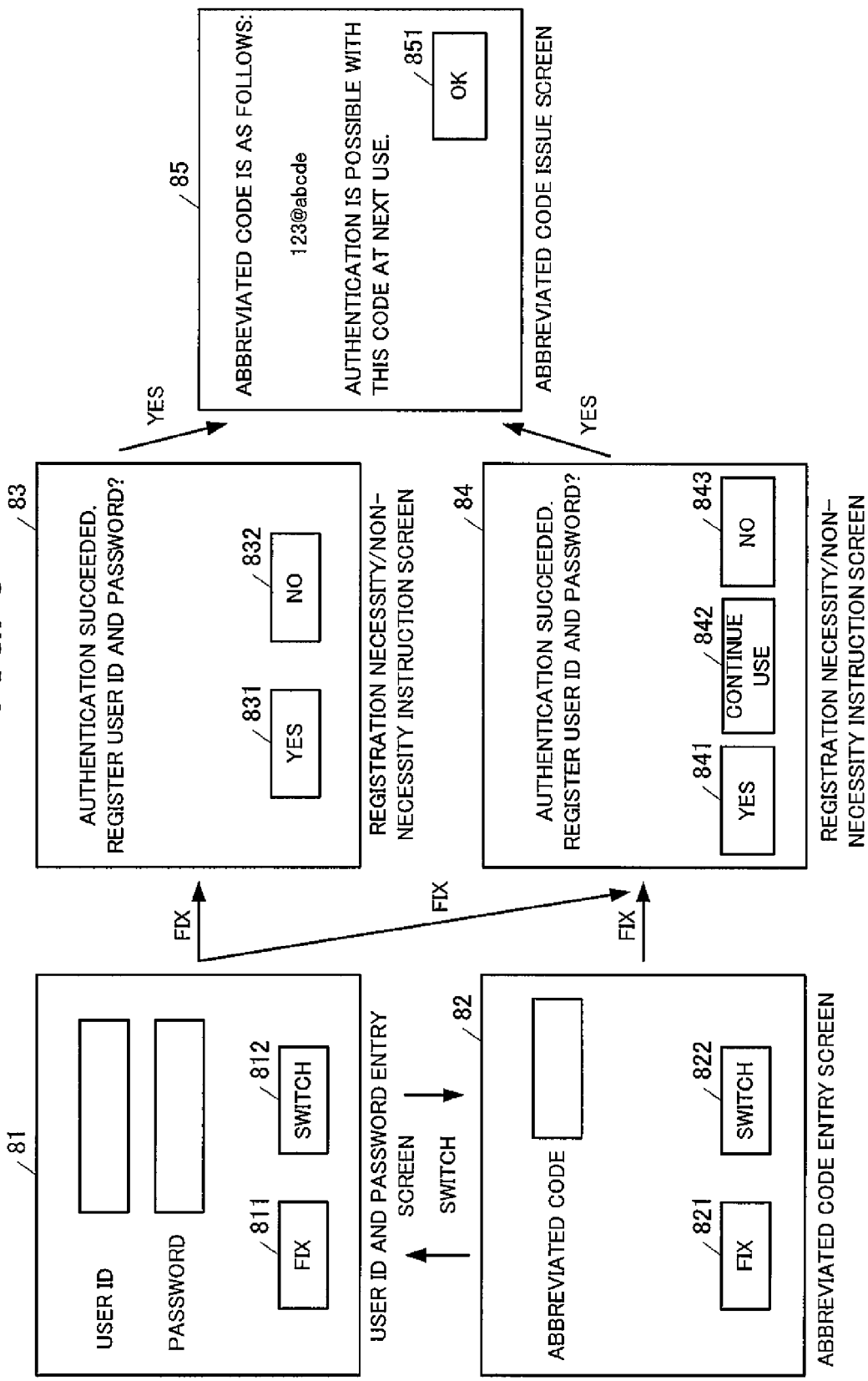
FIG. 5 illustrates transitions of screens sequentially displayed on a display unit when carrying out an authentication procedure.

(3.2 Transitions of Screens) FIG. 5 illustrates transitions of screens sequentially displayed on the display unit 126 when carrying out the authentication procedure.

As illustrated in FIG. 5, for the authentication procedure, first, the display unit 126 displays either a user ID and password entry screen 81 or an abbreviated code entry screen 82. The user ID and password entry screen 81 is a screen for entering a user ID and a password. The abbreviated code entry screen 82 is a screen for entering an abbreviated code.

To enable an entry of the user ID and the password and an entry of the abbreviated code for the authentication, by executing a screen switch instruction using keys (software keys to be operated) 812 and 822, a screen displayed on the display unit 126 can be switched between the user ID and password entry screen 81 and the abbreviated code entry screen 82. However, the user ID and password entry screen 81 and the abbreviated code entry screen 82 are not necessarily required to be provided as separate screens. For example, one screen may enable both the entry of the user ID and the password and the entry of the abbreviated code, and the user may enter either the user ID and the password or the abbreviated code.

When the user ID and the password are entered from the user ID and password entry screen 81 and a key entry of an entry fix instruction is carried out using a key 811, or when the abbreviated code is entered from the abbreviated code entry screen 82 and a key entry of an entry fix instruction is carried out using a key 821, the digital MFP 10 carries out the authentication process. After the authentication succeeds, the display unit 126 displays a registration necessity/non-necessity instruction screen 83 or 84 requesting the operator for an instruction as to whether or not to store the successfully authenticated user ID and the password along with the abbreviated code in the flash memory 121. When the successfully authenticated user ID and the password are not registered yet, the display unit 126 displays the registration necessity/non-necessity instruction screen 83. When the successfully authenticated user ID and the password have already been registered, the display unit 126 displays the registration necessity/non-necessity instruction screen 84.

When a key entry of an abbreviated code issue request is carried out using a key 831 of the registration necessity/non-necessity instruction screen 83, or when a key entry of an abbreviated code issue request is carried out using a key 841 of the registration necessity/non-necessity instruction screen 84, an abbreviated code issue screen 85 is called to the display unit 126. The abbreviated code issue screen 85 displays an abbreviated code generated by the abbreviated code generation unit 152.

Figure 6:
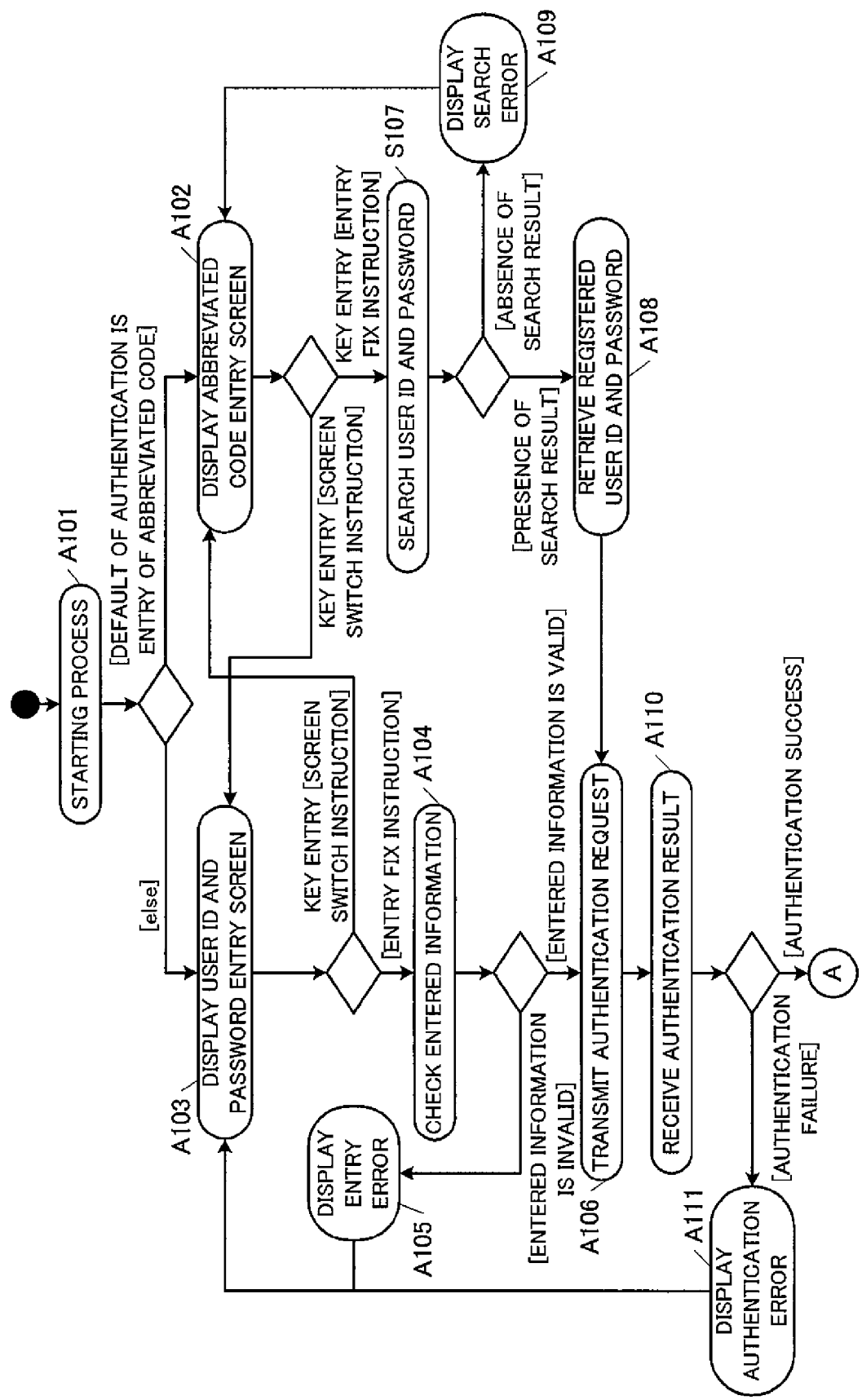
FIG. 6 illustrates an activity diagram of a flow of processes relating to the authentication.
Figure 7:
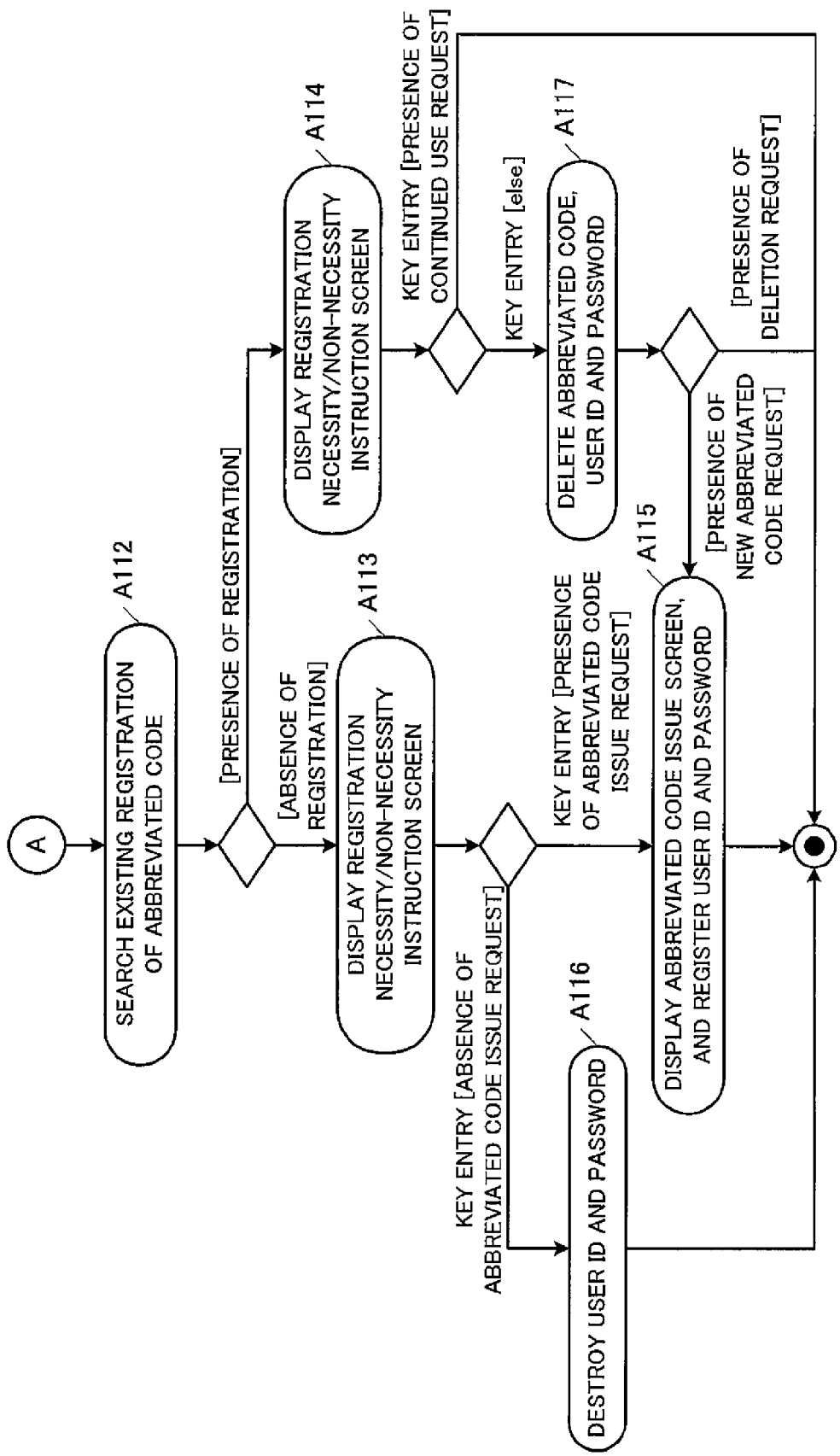
FIG. 7 illustrates an activity diagram of a flow of processes relating to the authentication.

(3.3 Operation Relating to Authentication) FIG. 6 and FIG. 7 are activity diagrams illustrating a flow of processes relating to authentication.

When power is turn on, the digital MFP 10 carries out a starting process (step A101). When an entry of an abbreviated code by the operator is set as a default of the authentication, the display unit 126 displays the abbreviated code entry screen 82 (step A102). When an entry of a user ID and a password by the operator is set as a default of the authentication, the display unit 126 displays the user ID and password entry screen 81 (step A103). When a screen switch instruction is entered using the key 822 of the abbreviated code entry screen 82, the user ID and password entry screen 81 is called to the display unit 126 (step A103). Then, when a screen switch instruction is entered using the key 812 of the user ID and password entry screen 81, the abbreviated code entry screen 82 is called to the display unit 126 (step A102).

When an entry fix instruction is entered using the key 811 of the user ID and password entry screen 81, the digital MFP 10 checks the information entered from the user ID and password entry screen 81 (step A104). When the entered information is invalid, for example, when the entered information includes a character prohibited to be used, or when only one of the user ID and the password is entered, the display unit 126 displays an entry error notifying the operator that the entered information is invalid (step A105) Then, the display unit 126 displays again the user ID and password entry screen 81 (step A103). Meanwhile, when the entered information is valid, the digital MFP 10 proceeds onto step A106.

When an entry fix instruction is entered using the key 821 of the abbreviated code entry screen 82, the authentication unit 151 searches whether or not the user ID and the password, which form a pair with the abbreviated code entered from the abbreviated code entry screen 82, are registered in the flash memory 121 (step A107). In case of a presence of a search result, a search unit retrieves the registered user ID and the password (step A108). Then, the digital MFP 10 proceeds onto step A106. Meanwhile, in case of an absence of the search result, the display unit 126 displays a search error notifying the operator that the abbreviated code is not registered (step A109). The display unit 126 displays again the abbreviated code entry screen 82 (step A102).

Next, the authentication unit 151 transmits an authentication request including the user ID and the password to the authentication server 30 (step A106), and receives an authentication result with respect to the user ID and the password from the authentication server 30 (step A110). The user ID and the password, which are to be included in the authentication request by the authentication unit 151, are the user ID and the password entered from the user ID and password entry screen 81 by the operator or the user ID and the password that form a pair with the abbreviated code entered from the abbreviated code entry screen 82 by the operator.

When the authentication succeeds in the series of the authentication procedure, the digital MFP 10 proceeds to the step A112. When the authentication fails, the display unit 126 displays an authentication error notifying the operator that the authentication has failed (step A111). Then, the display unit 126 displays again the user ID and the password entry screen 81.

After the authentication succeeds, the digital MFP 10 searches whether or not the abbreviated code that forms a pair with the successfully authenticated user ID and the password is already registered in the flash memory 121 (step A112). In case of an absence of the registration, the display unit 126 displays the registration necessity/non-necessity instruction screen 83 (step A113). In case of a presence of the registration, the display unit 126 displays the registration necessity/non-necessity instruction screen 84 (step A114).

In the registration necessity/non-necessity instruction screen 83, when a key entry for requesting an issuance of an abbreviated code is carried out using the key 831, the display unit 126 displays the abbreviated code issue screen 85. In addition, the digital MFP 10 associates and registers the successfully authenticated user ID and the password in the flash memory 121 along with the abbreviated code that forms a pair with the user ID and the password (step A115). After a termination operation is carried out by a key 851, the process ends.

Meanwhile, in the registration necessity/non-necessity instruction screen 83, when a key entry not requesting an issuance of an abbreviated code is carried out using the key 832, the digital MFP 10 destroys the successfully authenticated user ID and password, which are temporarily stored in the RAM 113, without storing the user ID and the password in the flash memory 121 (step A116). Then, the process ends.

In the registration necessity/non-necessity instruction screen 84, when a key entry requesting a continued use of the abbreviated code is carried out using the key 842, the digital MFP 10 ends the process. In this case, the abbreviated code already registered in the flash memory 121 can continue to be entered for the authentication.

Meanwhile, in the registration necessity/non-necessity instruction screen 84, when a key entry requesting an issuance of a new abbreviated code is carried out using the key 841, the digital MFP 10 deletes the user ID and the password, which are the same as the successfully authenticated user ID and the password, from the flash memory 121 along with the abbreviated code that forms a pair with the user ID and the password (activity A117). Then, the display unit 126 displays the abbreviated code issue screen 85. The successfully authenticated user ID and the password are associated with a new abbreviated code and registered in the flash memory 121 (step A115). Then, after a termination operation is carried out by the key 851, the process ends.

In the registration necessity/non-necessity instruction screen 84, when a key entry requesting a deletion is carried out using the key 843, the digital MFP 10 deletes the user ID and the password, which are the same as the successfully authenticated user ID and the password, from the flash memory 121 along with the abbreviated code that forms a pair with the user ID and the password (step A117). Then, the process ends.

According to the above-described configuration and the flow of the processes, in the digital MFP 10, the abbreviated code is automatically generated by the abbreviated code generation unit 152. Therefore, for registering the user ID and the password in the flash memory 121 along with the abbreviated code that forms the pair, time and effort may be saved for entering the abbreviated code.

When the operator wishes, the user ID and the password may not be registered in the flash memory 121. In addition, the user ID and the password already registered in the flash memory 121 may be deleted from the flash memory 121. As a result, secrecy of the user ID and the password may be ensured easily.

In the above-described digital MFP 10, among the user ID and the password stored in the flash memory 121 along with abbreviated code, when a user ID and a password is retrieved a prescribed number of times or more and used for acquiring the authentication success or failure information by the authentication unit 151, such a user ID and password are deleted. Alternatively, after a prescribed period of time elapses from when the authentication information is registered in the flash memory 121, the authentication information is deleted from the flash memory 121. Accordingly, the user ID and the password may be prevented from being left stored in the flash memory 121. As a result, the secrecy of the user ID and the password may be ensured even more easily.

While the present invention is described with respect to embodiments thereof, it will be apparent to those skilled in the art that the invention may be modified in numerous ways and may assume many embodiments other than those specifically set out and described above. Accordingly, the appended claims cover all modifications of the present invention that fall within the true spirit and scope of the present invention.

What is claimed is:

1. A processing device, which carries out an authentication of an operator by authentication information prior to usage of the processing device, the processing device comprising:
   an operation unit arranged to be operated by the operator;
   means for authenticating which acquires authentication success or failure information from a remote authentication server with respect to authentication information entered by the operator using the operation unit;
   means for generating a unique abbreviated code which forms a pair with the successfully authenticated authentication information;
   a first means for storing the pair of the abbreviated code and the authentication information; and
   means for requesting from the operator, after the authentication succeeds, an instruction regarding whether or not to store the successfully authenticated authentication information along with the abbreviated code in a second means for storing;
   wherein when a first operation is performed on the operation unit in response to the request of the means for requesting, the pair of the abbreviated code and the successfully authenticated authentication information is stored in the second means for storing, and
   in place of the authentication information entered by the operator using the operation unit, the means for authenticating retrieves authentication information that forms a pair with the, abbreviated code, based on the abbreviated code entered by the operator using the operation unit from the second means for storing, and acquires authentication success or failure information from the remote authentication server based on the retrieved authentication information and the abbreviated code from the second means for storing.

2. The processing device according to claim 1, wherein when a second operation is performed on the operation unit in response to the request of the means for requesting, the successfully authenticated authentication information is not stored in the second means for storing.

3. The processing device according to claim 1, wherein both the authentication information and the abbreviated code can be entered using the operation unit, and when the first means for storing stores the pair of the authentication information and the abbreviated code, the means for authenticating can acquire the authentication success or failure information for both the authentication information entered by the operator using the operation unit, and the authentication information that forms the pair with the abbreviated code entered by the operator using the operation unit.

4. The processing device according to claim 1, wherein when the second means for storing stores the pair of the authentication information and the abbreviated code, in case authentication information that is same as the stored authentication information is successfully authenticated and a third operation is performed on the operation unit in response to the request of the means for requesting, the authentication information that is the same as the successfully authenticated authentication information is deleted from the second means for storing.

5. The processing device according to claim 1, wherein when the authentication information is retrieved at least a prescribed number of times and used for acquiring the authentication success or failure information, the authentication information is deleted from the second means for storing.

6. The processing device according to claim 1, wherein when at least a prescribed period of time elapses from when the authentication information is stored, the authentication information is deleted from the second means for storing.

7. The processing device according to claim 1, wherein the means for authenticating executes an option process of transmitting a search request to the authentication server and receiving a search result including record information from the authentication server.

8. The processing device according to claim 1, wherein the means for generating generates an abbreviated code including a unique character string different from the abbreviated code already stored in the first means for storing.

9. The processing device according to claim 1, wherein the means for generating generates an abbreviated code including an irregular character string that increases difficulty in prediction of the authentication information, which forms a pair with the abbreviated code.

10. The processing device according to claim 1, wherein after the authentication succeeds, when the means for requesting requests from the operator an instruction regarding whether or not to store the successfully authenticated authentication information in the second means for storing along with the abbreviated code generated by the means for generating, in case the successfully authenticated authentication information is already stored in the first means for storing along with the abbreviated code that forms the pair, the means for displaying displays a first registration necessity or non-necessity instruction screen, and in case the successfully authenticated authentication information is not stored in the second means for storing along with the abbreviated code that forms the pair, the means for displaying displays a second registration necessity or non-necessity authentication screen.

11. The processing device according to claim 10, wherein with respect to the first registration necessity or non-necessity instruction screen, an instruction can be made to enable a continued entry of the abbreviated code already stored in the first means for storing for carrying out the authentication.

12. The processing device according to claim 1, wherein when the first means for storing stores the pair of the authentication information and the abbreviated code, in case the authentication succeeds with respect to authentication information that is same as the stored authentication information and a fourth operation is performed on the operation unit in response to the request of the means for requesting, the authentication information that is the same as the successfully authenticated authentication information is deleted from the second means for storing along with the abbreviated code that forms the pair, and the means for generating generates a new abbreviated code and the generated abbreviated code and the successfully authenticated authentication information are associated and stored in the second means for storing.

13. A processing method of a processing device, which carries out an authentication of an operator by authentication information prior to usage of the processing device, the processing method comprising the steps of:
  authenticating by acquiring from a remote authentication server, authentication success or failure information with respect to authentication information entered by the operator using an operation unit;
  generating a unique abbreviated code that forms a pair with the successfully authenticated authentication information;
  storing the pair of the authentication information and the abbreviated code in a first means for storing; and
  requesting from the operator, after the authentication succeeds, an instruction as to whether or not to store the successfully authenticated authentication information in second means for storing along with the abbreviated code generated at the generating step;
  wherein when a first operation is performed on the operation unit at the requesting step, the pair of the abbreviated code and the successfully authenticated authentication information is stored in the second means for storing at the storing step, and in place of the authentication information entered by the operator using the operation unit, at the authentication step, the authentication information that forms the pair with the abbreviated code, the abbreviated code entered by the operator using the operation unit is retrieved from the second means for storing, and authentication success or failure information is acquired from the remote authentication server based on the retrieved authentication information and the abbreviated code from the second means for storing.

14. The processing method according to claim 13, wherein the storing step further comprises not storing the successfully authenticated authentication information in the second means for storing when a second operation is performed on the operation unit at the requesting step.

15. The processing method according to claim 13, wherein when the first means for storing stores the pair of the abbreviated code and the authentication information, at the authenticating step, the authentication success or failure information can be acquired with respect to both the authentication information entered by the operator using the operation unit and the authentication information that forms the pair with the abbreviated code entered by the operator using the operation unit.

16. The processing method according to claim 13, further comprising the step of deleting, when the second means for storing stores the pair of the abbreviated code and the authentication information, in case authentication information that is same as the stored authentication information is successfully authenticated and a third operation is performed on the operation unit at the requesting step, the deleting step deletes the authentication information that is the same as the successfully authenticated authentication information from the second means for storing.

17. The processing method according to claim 13, further comprising the step of deleting the authentication information from the second means for storing when the authentication information is retrieved at least a prescribed number of times and used for acquiring the authentication result.

18. The processing method according to claim 13, further comprising the step of deleting the authentication information from the second means for storing when at least a prescribed period of time elapses from when the authentication information is stored.

19. The processing method according to claim 13, wherein the generating step further comprises generating, an abbreviated code including a unique character string different from the abbreviated code already stored in the means for storing.

20. The processing method according to claim 13, wherein the generating step further comprises generating an abbreviated code including an irregular character string that increases difficulty in prediction of the authentication information, which forms a pair with the abbreviated code.

21. The processing device according to claim 1, wherein when logging in under a state in which the abbreviated code has been already stored, the operator can select whether to issue another abbreviated code or to continue to use the stored abbreviated code.

* * * * *